United States Patent Office 3,542,547
Patented Nov. 24, 1970

3,542,547
PHOTOCONDUCTIVE ELEMENTS
Charles V. Wilson, Rochester, N.Y., assignor to Eastman Kodak Company, Rochester, N.Y., a corporation of New Jersey
No Drawing. Continuation-in-part of application Ser. No. 536,994, Mar. 24, 1966, which is a continuation-in-part of application Ser. No. 261,206, Feb. 26, 1963. This application May 1, 1967, Ser. No. 634,908
Int. Cl. G03g 5/06
U.S. Cl. 96—1.6    17 Claims

ABSTRACT OF THE DISCLOSURE

Photoconductive elements containing stable organic photoconductors, such photoconductors being triarylmethane leuco bases containing, in addition to amino substituents, other substituents such as alkyl, alkoxy, halogen, hydroxyl, etc., in at least the ortho positions on two phenyl moieties.

---

This application is a continuation-in-part application of my application Ser. No. 536,994 filed Mar. 24, 1966 now abandoned, which in turn is a continuation-in-part of application Ser. No. 261,206, filed Feb. 26, 1963, now abandoned.

This invention relates to photoconductive layers of the kind used in photoconductive elements for electrophotographic processes like xerography. Particularly the invention provides novel photoconductive layers in which the photoconductive material is a stable leuco base of a triarylmethane dye.

The use of photoconductive elements which comprise a conductive layer, usually a conductive support material such as metal or conductive paper, and a photoconductive layer, usually a photoconductive material dispersed in an insulating film-forming binder, in processes such as xerography, and other electrophotographic processes is well known. Such elements when used in a xerographic process are called xerographic plates.

Triarylmethane dyes have been used in xerographic elements as sensitizers for the photoconductive layer. For example, in a layer containing zinc oxide as the photoconductive material in an insulating binder, a very small amount of crystal violet dye may be added as a sensitizer.

According to the present invention, photoconductive layers of the kind described are provided in which the photoconductive material is a stable leuco base of a triarylmethane dye. In preferred embodiments of the invention, the photoconductive material is dispersed in an insulating resin which serves as a film-forming binder for the photoconductive layer.

The leuco base of crystal violet is a fairly good photoconductive material in photoconductive layers. However, this material is not stable and tends to form its dye derivative when exposed to air and light. While a trace of the dye derivative may be useful for its sensitizing effect in the layer, presence of the dye derivative may also cause undesirable coloration in the layer.

Therefore, we use a triarylmethane leuco base that is stable against spontaneous dye formation under ordinary atmospheric conditions. Such stability is characteristic of triarylmethane leuco bases having substituted members at the ortho-position on at least two of the three aryl nuclei of the triarylmethane molecule. These stable leuco bases are preferred in photoconductive layers because they resist formation of a colored dye in the photoconductive layer upon exposure to air and light.

Stable triarylmethane leuco bases that are useful in photoconductive layers in accordance with the present invention have the following formula:

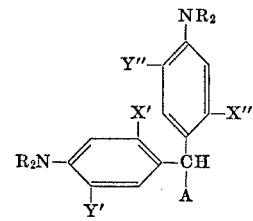

wherein the members R, X', X", Y', Y", and A are defined by one of the following two groups of definitions.

(I)

Each R is selected from the group consisting of alkyl and aralkyl;
Each of X' and X" is selected from the group consisting of alkyl, alkoxy, hydroxyl, and halogen;
Each of Y' and Y" is selected from the group consisting of alkyl, alkoxy, hydroxyl, halogen, and hydrogen; and
A is selected from the group consisting of phenyl, α-naphthyl, β-naphthyl, 9-anthryl and substituted derivatives thereof wherein at least one cyclic carbon is attached to a member selected from the group consisting of dialkylamino, alkylamino and amino in the 4-position, as well as alkyl, alkoxy, hydroxyl, and halogen.

(II)

Each R is hydrogen;
Each of X' and X" is selected from the group consisting of alkyl, alkoxy, hydroxyl and halogen;
Each of Y' and Y" is selected from the group consisting of alkyl, alkoxy, hydroxyl, halogen, and hydrogen; and
A is selected from the group consisting of p-dialkylaminophenyl and meta- and ortho- derivatives thereof wherein at least one of the meta and ortho carbon atoms is attached to a member selected from the group consisting of alkyl, alkoxy, hydroxyl, and halogen.

When two aryl nuclei in the triarylmethane molecule have tertiary amino groups, as defined by the group numbered I in the above definitions, then the third aryl group may be any of the broader group of members defined for the component A in Group I. However, when the two amino groups are primary amino, as in Group II, there must be a p-dialkylaminophenyl group or a substituted derivative thereof at the A position in order that the compound be photoconductive. The alkyl, alkoxy and alkylamino groups of the formulas of Groups I and II typically have 1 to 8 carbon atoms, although longer chains can be used. Such photoconductors are stable and have improved speed.

The class of stable leuco base triarylmethanes defined above comprises a large number of useful compounds for making photoconductive layers according to the present invention. The compounds listed in Table 1 below are typical examples of photoconductive compounds within the class defined.

TABLE 1

Compound No.
(1) 4',4"-bis(diethylamino)-2',2" - dimethyltriphenylmethane (R=ethyl, X' and X"=methyl, A=phenyl, Group I)
(2) 4',4"-diamino-4-dimethylamino-2',2",5',5" - tetramethyltriphenylmethan (X' and X"=methyl, Y' and Y"=methyl, R=H, A=p-dimethylaminophenyl, Group II)
(3) 4',4"-bis(diethylamino)-2,6-dichloro-2', 2" - dimethyltriphenylmethane (X' and X"=methyl, R=ethyl, A=2,6-dichlorophenyl, Group I)

(4) 4′,4″-bis(diethylamino)-2′,2″-diemthyldiphenyl-α-naphthylmethane (R=ethyl, X′ and X″=methyl, A=α-naphthyl, Group I)

(5) 2′,2″-dimethyl-4,4′,4″-tris(dimethylamino) - triphenylmethane (R=methyl, X′ and X″=methyl, A=p-dimethylaminophenyl, Group I)

(6) 4′,4″-bis(diethylamino)-4-dimethylamino - 2′,2″-5′,5″-tetramethyltriphenylmethane (R=tetramethyltriphenylmethane (R=ethyl, X′, X″=methyl, Y′, Y″=methyl, A=p-dimethylaminophenyl, Group I)

(7) 4′,4″-bis(diethylamino)-2-chloro-2′,2″-dimethyl-4-dimethylaminotriphenylmethane (R=ethyl, X′, X″=methyl, A=o-chloro-p-dimethylaminophenyl, Group I)

(8) 4′,4″-bis(diethylamino)-4-dimethylamino - 2,2′,2″-trimethyltriphenylmethane (R=ethyl, X′, X″=methyl, A=o-methyl-p-dimethylaminophenyl, Group I)

(9) 4′,4″-bis(dimethylamino)-2-chloro-2′,2″-dimethyltriphenylmethane (R=methyl, X′, X″=methyl, A=o-chlorophenyl, Group I)

(10) 4′,4″-bis(dimethylamino) - 2′,2″-dimethyl - 4-methoxytriphenylmethane (R=methyl, X′, X″=methyl, A=p-methoxyphenyl, Group I)

(11) 4′,4″-bis(benzylethylamino) - 2′,2″-dimethyltriphenylmethane (R=benzyl and ethyl, X′, X″=methyl, A=phenyl, Group I)

(12) 4′,4″-bis(diethylamino)-2′,2″,5′,5″ - tetramethyltriphenylmethane (R=ethyl, X′, X″=methyl, Y′, Y″=methyl, A=phenyl, Group I)

(13) 4′,4″-bis(diethylamino)-2′,2″-diethoxytriphenylmethane (R=ethyl, X′, X″=ethoxy, A=phenyl, Group I)

(14) 4′,4″-bis(diethylamino)-2′,2″-dimethyldiphenyl-β-naphthylmethane (R=ethyl, X′ and X″=methyl, A=β-naphthyl, Group I)

(15) 4′,4″-bis(diethylamino)-2′2″-dimethyldiphenyl-9-anthrylmethane (R=ethyl, X′ and X″=methyl, A=9-anthryl, Group I)

(16) 4′,4″ - diamino-4-dimethylamino - 2′,2″-diethyl-5′,5″-dichlorotriphenylmethane (X′ and X″=ethyl, Y′ and Y″=chloro, R=H, A=p-dimethylaminophenyl, Group II)

(17) 4,4′,4″-trisdiethylamino-2,2′,2″-trimethyltriphenylmethane (R=ethyl, X′, X″=methyl, A=p-diethylaminophenyl, Group I).

Following are examples showing preparation and tests of xerographic elements to illustrate certain preferred embodiments of the present invention.

EXAMPLE 1

To a solution of 0.5 gm. of compound 3 in Table 1 and 0.025 gm. of 4-(4-n-amyloxyphenyl)-2,6-bis(4-ethylphenyl) thiapyrylium perchlorate in 15 ml. tetrahydrofuran is added 2 gm. of Vitel resin. (Vitel is a copolyester of terephthalic acid and a mixture of ethylene glycol (1 part by weight) and 2,2-bis(4-β-hydroxyethoxyphenyl) propane (9 parts by weight) obtained from Goodyear Tire & Rubber Co.). The mixture was agitated to obtain a clear viscous solution which was then coated on a sheet of aluminum foil and dried. Samples of the coated product were charged by means of a negative corona and then exposed through a .15 log E neutral density step tablet to light from a 300 watt tungsten lamp at 13 inches for 12 seconds. The samples then were toned with xerographic toner particles having negative triboelectric charge. The toner image was then fixed by heating. Twenty steps were developed. By the same procedures, sample xerographic plates were prepared using, respectively, each of the first five triarylmethane leuco base compounds listed in Table 1 and each sample was tested. Results of the tests are tabulated in Table 2.

TABLE 2

Photoconductive compound No. (from Table 1):
Steps developed after step tablet exposure

| | |
|---|---|
| 1 | 23 |
| 2 | 14 |
| 3 | 20 |
| 4 | 22 |
| 5 | 23 |

EXAMPLE 2

Using compound 1 in Table 1 as the photoconductive material, and using various insulating resins and various sensitizers, xerographic plates were prepared and tested by the methods described in Example 1. In Table 3 are tabulated the components used and the test results obtained.

TABLE 3

[4′,4″-bis(diethylamino)-2′,2″-dimethyltriphenylmethane (Compound 1, Table 1)]

| Plate: | Insulating resin | Sensitizer | Steps developed |
|---|---|---|---|
| A | Vitel | 4-(4-n-amyloxyphenyl)-2,6-bis(4-ethylphenyl)-thiapyryllium perchlorate | 23 |
| B | do | None (control) | 16 |
| C | do | Chloranil | 18 |
| D | Polystyrene | 2,3-dichloro-5,6-dicyanobenzoquinone | 17 |

Insulating resins other than those used in the examples are suitable for use as film-forming binders for layers containing the stable triarylmethane leuco base photoconductors. The present invention is not intended to be limited to use of any certain insulating binder materials. Some examples of suitable insulating resin binders are silicone resins such as the SR series of resins sold by General Electric Co., acrylate resins such as the Acryloid series of resins sold by Rohm and Haas Co. and the Lucite series sold by E. I. du Pont de Nemours and Co., polystyrene polymers, various mixtures of insulating resins and the like. Selection of an insulating resin binder material will depend somewhat upon the application intended for the photoconductive element.

Other sensitizers are suitable for use in photoconductive layers containing the leuco base photoconductors and the invention is not meant to be limited to any particular sensitizer, although the pyrylium, thiapyrylium and selenapyrylium sensitizing dyes of U.S. 3,250,615 are particularly useful. When it is desired to retain a neutral hue in the photoconductive layer, a neutral hue sensitizer such as methylene gray may be used. It is preferred to employ a sensitizing dye that is not an oxidizing agent. Photosensitive layers according to the present invention should be clearly distinguished from those in which an unstable triphenylmethane leuco base such as the leuco base of crystal violet is used, which readily oxidizes to its dye derivative upon exposure to air and light. A wide variety of compounds are known to be useful as sensitizers for organic photoconductors and the present invention contemplates the use of any such sensitizer as may be needed for the stable leuco base triarylmethane photoconductors. The invention also comprises layers containing the leuco base photoconductors without sensitizers for use in applications where sensitizers are unnecessary.

The invention also comprises photoconductive elements having a plurality of photoconductive layers, at least one of which consists essentially of a substantial proportion of a stable leuco base triarylmethane photoconductor of the class described above in an insulating binder, either with or without sensitizers.

The conductive layer in a xerographic element according to the present invention may be any of a number of conductive materials that have been found suitable for use with other photoconductive layers in xerographic elements. Usually the conductive layer also serves as a support for the photoconductive layer, and is usually a metal plate or foil, or a suitable conductive paper, or a transparent conductive film.

One advantage of the photoconductive layers described is that, because the photoconductor is transparent, the layer can be made transparent by selection of a transparent insulating resin binder. Thus, with a transparent conducting support a transparent xerographic element can be made for use in applications such as xerographic microfilming. Another advantage is that the photoconductor will remain colorless, permitting use in xerographic elements in which a neutral hue is desired.

It will be understood that modifications and variations may be made within the scope of the invention as described above and as defined in the following claims.

I claim:

1. A photoconductive element for use in electrophotography, comprising a support having coated thereon a photoconductive insulating layer which comprises an organic photoconductor dispersed in a film-forming insulating resin binder, said organic photoconductor comprising a stable triarylmethane leuco base having the formula:

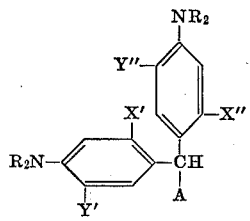

wherein the members R, X', X", Y', Y", and A are each defined by a group of definitions selected from the class consisting of:

(I)

each R is selected from the group consisting of alkyl and aralkyl;
each of X' and X" is selected from the group consisting of alkyl, alkoxy, and halogen;
each of Y' and Y" is selected from the group consisting of alkyl, alkoxy, hydroxyl, halogen, and hydrogen; and
A is selected from the group consisting of phenyl, α-naphthyl, β-naphthyl, 9-anthryl and substituted derivatives thereof wherein at least one cyclic carbon is attached to a member selected from the group consisting of dialkylamino, alkylamino and amino in the 4-position, alkyl, alkoxy, hydroxyl, and halogen;

and (II)

each R is hydrogen;
each of X' and X" is selected from the group consisting of alkyl, alkoxy, and halogen;
each of Y' and Y" is selected from the group consisting of alkyl, alkoxy, hydroxyl, halogen, and hydrogen; and
A is selected from the group consisting of p-dialkylaminophenyl and meta- and ortho-derivatives thereof wherein at least one of the meta and ortho carbon atoms is attached to a member selected from the group consisting of alkyl, alkoxy, hydroxyl, and halogen.

2. The photoconductive element defined in claim 1 wherein said stable leuco base is 4',4"-bis(diethylamino)-2',2"-dimethyltriphenylmethane.

3. The photoconductive element defined in claim 1 wherein said stable leuco base is 4',4"-diamino-4-dimethylamino-2',2",5',5"-tetramethyltriphenylmethane.

4. The photoconductive element defined in claim 1 wherein said stable leuco base is 4',4"-bis(diethylamino)-2,6-dichloro-2',2"-dimethyltriphenylmethane.

5. The photoconductive element defined in claim 1 wherein said stable leuco base is 4',4"-bis(diethylamino)-2',2"-dimethyldiphenyl-α-naphthylmethane.

6. The photoconductive element defined in claim 1 wherein said stable leuco base is 2',2"-dimethyl-4,4',4"-tris(dimethylamino)triphenylmethane.

7. The photoconductive element defined in claim 1 wherein said stable leuco base is 4',4"-bis(diethylamino)-4-dimethylamino-2',2",5',5"-tetramethyltriphenylmethane.

8. The photoconductive element defined in claim 1 wherein said stable leuco base is 4',4"-bis(diethylamino)-2 - chloro - 2',2" - dimethyl - 4 - dimethylaminotriphenylmethane.

9. The photoconductive element defined in claim 1 wherein said stable leuco base is 4',4"-bis(diethylamino)-4-dimethylamino-2',2"-trimethyltriphenylmethane.

10. The photoconductive element defined in claim 1 wherein said stable leuco base is 4',4"-bis(dimethylamino-2-chloro-2',2"-dimethyltriphenylmethane.

11. The photoconductive element defined in claim 1 wherein said stable leuco base is 4',4"-bis(dimethylamino-2',2"-dimethyl-4-methoxytriphenylmethane.

12. The photoconductive element defined in claim 1 wherein said stable leuco base is 4',4"-bis(benzylethylamino)-2',2"-dimethyltriphenylmethane.

13. A photoconductive element as defined in claim 1 further comprising a sensitizer for improving the photoconductive property of said insulating layer dispersed with said organic photoconductor in said film-forming insulating resin binder.

14. A photoconductive element for use in electrophotography, comprising a support having coated thereon a photoconductive insulating layer which comprises an organic photoconductor dispersed in a film-forming insulating resin binder, said organic photoconductor comprising a stable triarylmethane leuco base having the formula:

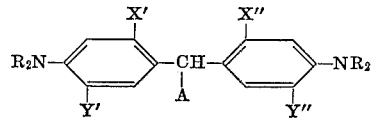

wherein:
(1) R is selected from the group consisting of hydrogen, and an alkyl radical,
(2) X' and X" are each selected from the group consisting of an alkyl radical and an alkoxy radical.
(3) Y' and Y" are each selected from the group consisting of hydrogen, an alkyl radical, and an alkoxy radical, and
(4) A is a phenyl radical, A being a dialkylaminophenyl radical when all of said R groups are hydrogen.

15. A photoconductive element defined by claim 14 wherein the photoconductive insulating layer is sensitized with a thiapyrylium sensitizing dye.

16. A photoconductive element for use in electrophotography, comprising a support having coated thereon a photoconductive insulating layer which comprises an organic photoconductor dispersed in a film-forming insulating resin binder, said organic photoconductor comprising a stable triarylmethane leuco base having the formula:

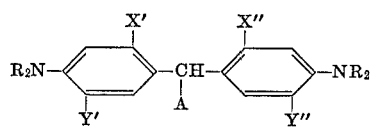

wherein:
(1) R is selected from the group consisting of hydrogen, methyl and ethyl,
(2) X' and X" are each methyl, (3) Y' and Y" are each selected from the group consisting of hydrogen and methyl, and
(4) A is selected from the group consisting of phenyl, p-dimethylaminophenyl, 2,6-dichlorophenyl and α-naphthyl, A being p-dimethylaminophenyl when all of said R groups are hydrogen.

17. In an electrophotographic process wherein an electrostatic charge pattern is formed on a photoconductive element, the improvement characterized in that said photoconductive element has a photoconductive layer comprising a stable triarylmethane leuco base having the formula:

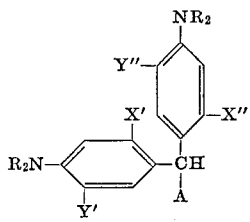

wherein the members R, X', X", Y', Y", and A are each defined by a group of definitions selected from the class consisting of:

(I)

each R is selected from the group consisting of alkyl and aralkyl;
each of X' and X" is selected from the group consisting of alkyl, alkoxy, and halogen;
each of Y' and Y" is selected from the group consisting of alkyl, alkoxy, hydroxyl, halogen, and hydrogen; and
A is selected from the group consisting of phenyl, α-naphthyl, β-naphthyl, 9-anthryl and substituted derivatives thereof wherein at least one cyclic carbon is attached to a member selected from the group consisting of dialkylamino, alkylamino and amino in the 4-position, alkyl, alkoxy, hydroxyl, and halogen;

and (II)

each R is hydrogen;
each of X' and X" is selected from the group consisting of alkyl, alkoxy, and halogen;
each of Y' and Y" is selected from the group consisting of alkyl, alkoxy, hydroxyl, halogen and hydrogen; and
A is selected from the group consisting of p-dialkylaminophenyl and meta- and ortho- derivatives thereof wherein at least one of the meta and ortho carbon atoms is attached to a member selected from the group consisting of alkyl, alkoxy, hydroxyl, and halogen;

as a photoconductive material.

References Cited

UNITED STATES PATENTS

| | | | |
|---|---|---|---|
| 1,149,575 | 8/1915 | Gartner et al. | 260—393 |
| 3,112,326 | 11/1963 | Rudner et al. | 260—391 |
| 3,180,730 | 4/1965 | Klupfel et al. | 96—1.5 |
| 3,155,503 | 11/1964 | Cassiers et al | 96—1.5 |
| 3,250,615 | 5/1966 | Van Allan et al. | 96—1.7 |
| 3,274,000 | 9/1966 | Noe et al. | 96—1.5 |

FOREIGN PATENTS 1,318,863   1/1963   France.

GEORGE F. LESMES, Primary Examiner

C. E. VAN HORN, Assistant Examiner

U.S. Cl. X.R.

96—1.5, 1; 260—386, 388, 389, 390